(12) United States Patent
Tomita

(10) Patent No.: US 10,747,820 B2
(45) Date of Patent: Aug. 18, 2020

(54) AFFINITY CALCULATION APPARATUS, AFFINITY CALCULATION METHOD, AND COMPUTER PROGRAM

(71) Applicant: KONICA MINOLTA, INC., Chiyoda-ku, Tokyo (JP)

(72) Inventor: Kouichi Tomita, Kawanishi (JP)

(73) Assignee: KONICA MINOLTA, INC., Tokyo (JP)

(*) Notice: Subject to any disclaimer, the term of this patent is extended or adjusted under 35 U.S.C. 154(b) by 188 days.

(21) Appl. No.: 15/476,749

(22) Filed: Mar. 31, 2017

(65) Prior Publication Data

US 2017/0329771 A1 Nov. 16, 2017

(30) Foreign Application Priority Data

May 10, 2016 (JP) ................................ 2016-094413

(51) Int. Cl.
*G06F 17/00* (2019.01)
*G06F 16/93* (2019.01)
*G06F 16/248* (2019.01)
*G06F 16/28* (2019.01)
*G06F 16/2457* (2019.01)
(Continued)

(52) U.S. Cl.
CPC ............ *G06F 16/93* (2019.01); *G06F 16/248* (2019.01); *G06F 16/24578* (2019.01); *G06F 16/288* (2019.01); *G06Q 10/00* (2013.01); *G06Q 30/00* (2013.01)

(58) Field of Classification Search
CPC .. G06F 17/30011; G06F 16/93; G06F 16/288; G06F 16/24578; G06F 16/248; G06Q 30/00; G06Q 10/00
See application file for complete search history.

(56) References Cited

U.S. PATENT DOCUMENTS 6,629,097 B1* 9/2003 Keith ................. G06F 17/30598
2006/0248573 A1* 11/2006 Pannu ..................... G06F 21/62
726/1
(Continued)

FOREIGN PATENT DOCUMENTS

JP 2005259074 A 9/2005
JP 2005352637 A 12/2005
(Continued)

OTHER PUBLICATIONS

Rao et al., "Affinity Measures based on the Graph Laplacian". 2008 (Year: 2008).*
(Continued)

*Primary Examiner* — Syed H Hasan
(74) *Attorney, Agent, or Firm* — Holtz, Holtz & Volek PC

(57) ABSTRACT

An affinity calculation apparatus for calculating a degree of affinity between a first element and a second element that are not directly relevant among three or more elements includes: an extraction section configured to extract, from a document, relevance of each of pairs of two directly relevant elements of the three or more elements; and a calculation section configured to calculate the degree, of the pairs, based on the relevance of each of pairs of two elements of the first element, the second element, and one or more intermediate elements that lie between the first element and the second element.

10 Claims, 14 Drawing Sheets

(51) Int. Cl.
*G06Q 10/00* (2012.01)
*G06Q 30/00* (2012.01)

(56) References Cited

U.S. PATENT DOCUMENTS

| | | | |
|---|---|---|---|
| 2010/0235489 A1* | 9/2010 | Cogan | G06F 17/30702 709/224 |
| 2012/0101808 A1* | 4/2012 | Duong-Van | G06F 40/30 704/9 |
| 2016/0162502 A1* | 6/2016 | Zhou | G06F 17/3097 707/722 |
| 2016/0188702 A1* | 6/2016 | Lee-Goldman | G06F 17/3064 707/749 |
| 2017/0185666 A1* | 6/2017 | Pasternack | G06F 17/30598 |
| 2018/0039691 A1* | 2/2018 | Hazra | G06Q 50/01 |

FOREIGN PATENT DOCUMENTS

| | | |
|---|---|---|
| JP | 2007128163 A | 5/2007 |
| JP | 2008287328 A | 11/2008 |
| JP | 2009271799 A | 11/2009 |

OTHER PUBLICATIONS

Zhang et al. "Improving Web Search Results Using Affinity Graph". 2005 (Year: 2005).*
Japanese Office Action (and English language translation thereof) dated Feb. 18, 2020 issued in Japanese Application No. 2016-094413.

* cited by examiner

| RELEVANCE PHRASE | FRIENDLINESS POINT | |
|---|---:|---|
| ALLIANCE | 50 | ~5A |
| FILE SUIT | −100 | ~5A |
| COMPETITION | −20 | ~5A |
| TRANSACTION | 20 | ~5A |
| SHAREHOLDER | 20 | ~5A |
| COMPETITOR | −40 | ~5A |
| CONTRACT | 10 | ~5A |
| JOINT DEVELOPMENT | 30 | ~5A |
| ⋮ | ⋮ | |

| COMPANY NAME | BUSINESS TYPE | ADDRESS | ... | |
|---|---|---|---|---|
| Name_A1 | COMPONENT MANUFACTURER | 1-2 B-MACHI, A-KU, TOKYO | ... | ~5B |
| Name_A2 | MEDICAL EQUIPMENT SALES | 3-4 D-MACHI, C-KU, OSAKA | ... | ~5B |
| Name_A3 | MEDICAL EQUIPMENT MANUFACTURER | 5-6 F-MACHI, E-KU, TOKYO | ... | ~5B |
| Name_A4 | MEDICAL EQUIPMENT MANUFACTURER | 7-8 H-MACHI, G-KU, FUKUOKA | ... | ~5B |
| ⋮ | ⋮ | ⋮ | ⋮ | |

| COMPANY NAME | | RELEVANCE PHRASE | FRIENDLINESS POINT | |
|---|---|---|---:|---|
| Name_A0 | Name_A1 | JOINT DEVELOPMENT | 30 | ~5D |
| Name_A0 | Name_A2 | COMPETITION | −20 | ~5D |
| Name_A1 | Name_A3 | TRANSACTION | 20 | ~5D |
| Name_A2 | Name_A3 | FILE SUIT | −100 | ~5D |
| Name_A0 | Name_A1 | SHAREHOLDER | 20 | ~5D |
| Name_A2 | Name_A5 | COMPETITION | −20 | ~5D |
| Name_A1 | Name_A4 | JOINT DEVELOPMENT | 30 | ~5D |
| Name_A2 | Name_A5 | COMPETITION | −20 | ~5D |

| COMPANY NAME | | RELEVANCE PHRASE | FRIENDLINESS POINT | OCCURRENCE TIMING | |
|---|---|---|---|---|---|
| Name_A0 | Name_A1 | JOINT DEVELOPMENT | 30 | 2016/01/01 | ~5F |
| Name_A0 | Name_A2 | COMPETITION | -20 | 2016/01/02 | ~5F |
| Name_A1 | Name_A3 | TRANSACTION | 20 | 2016/01/02 | ~5F |
| Name_A2 | Name_A3 | FILE SUIT | -100 | 2016/01/15 | ~5F |
| Name_A0 | Name_A1 | SHAREHOLDER | 20 | 2016/02/01 | ~5F |
| Name_A2 | Name_A5 | COMPETITION | -20 | 2016/02/03 | ~5F |
| Name_A1 | Name_A4 | JOINT DEVELOPMENT | 30 | 2016/02/06 | ~5F |
| Name_A2 | Name_A5 | COMPETITION | -20 | 2016/02/10 | ~5F |

AFFINITY CALCULATION APPARATUS, AFFINITY CALCULATION METHOD, AND COMPUTER PROGRAM

The entire disclosure of Japanese Patent Application No. 2016-094413 filed on May 10, 2016 including description, claims, drawings, and abstract are incorporated herein by reference in its entirety.

BACKGROUND OF THE INVENTION

Field of the Invention

The present invention relates to a technology to calculate a degree of affinity between two elements.

Description of the Related Art

For individuals, connections with other people are important and an asset. For companies, connections with other companies are important and a key factor to management strategies.

Therefore, technologies for grasping a relationship between individuals or a relationship between companies have been proposed.

A company correlative information extracting system described in JP 2009-271799 A includes: a document DB in which a plurality of pieces of document data whose release dates are associated are accumulated; a company name DB in which a plurality of company names are stored; an associated document extracting section that extracts the document data in which a plurality of the company names appear from the document DB, compares the release date of each document data and the appeared company names, and extracts a plurality of pieces of associated document data related to the same event; a keyword extracting section for extracting a keyword from each associated document data; and a company correlative information extracting section for checking the presence of the keyword for each associated document, identifying the keyword existing in two or more associated documents as a correlative keyword, and storing the company correlative information including a pair of company names and correlative keywords into a company correlative information DB.

An evaluation device described in JP 2008-287328 A detects, when receiving input of document data such as articles on newspaper or on a Web site about each company, words showing the characteristics of the company from the document, and generates article vectors expressing the characteristics of the document about the company on the basis of the number of appearances of the pertinent words. Furthermore, the evaluation device generates a partial space corresponding to the company by using a self-correlation matrix on the basis of an article vector group of each company, calculates inter-company similarity from angles between the generated partial spaces of the companies, and extracts the words related to each company by using the partial spaces. Then, the evaluation device visualizes the inter-company similarity with the related words in order to make it correspond to the distance of plots corresponding to the companies, and displays it as a company map.

According to the technology described in JP 2005-352637 A, an index calculation section selects a plurality of indexes of a plurality of years to be analyzed that represent features of a company from financial information, company information, and the like. A feature extracting section selects indexes of the plurality of years to be analyzed for the company and calculates a partial space representing feature of inter-year differences of the respective companies based upon an autocorrelation matrix. An original index relativity calculation section obtains an angle (canonical angle) formed by the base vector of the original index and the partial space. A similarity calculation section calculates an angle (canonical angle) formed by the partial space among the companies for all combinations of the companies. A similarity map display section calculates coordinates of two dimensions by a multidimensional scale method according to inter-company similarities to draw a map.

Meanwhile, in order to further expand connections, individuals or companies need to approach a party that is not directly relevant at the moment. In doing so, it is desirable to choose a party that is likely to be able to establish a good connection.

However, conventional technologies allow evaluation of only connections between parties that have already been relevant directly to each other. Therefore, it is difficult to find a party that is likely to be able to establish a good connection from among parties that are not directly relevant at the moment.

SUMMARY OF THE INVENTION

In view of such problems, it is an object of the present invention to make it possible to find, more easily than before, a party that is likely to be able to establish a good connection from among parties that are not directly relevant.

To achieve the abovementioned object, according to an aspect, an affinity calculation apparatus for calculating a degree of affinity between a first element and a second element that are not directly relevant among three or more elements, reflecting one aspect of the present invention comprises: an extraction section configured to extract, from a document, relevance of each of pairs of two directly relevant elements of the three or more elements; and a calculation section configured to calculate the degree, of the pairs, based on the relevance of each of pairs of two elements of the first element, the second element, and one or more intermediate elements that lie between the first element and the second element.

The affinity calculation apparatus preferably further comprises a storage section configured to store a point corresponding to each of keywords, wherein the extraction section preferably extracts each of the keywords as the relevance, and the calculation section preferably calculates the degree based on the point corresponding to each of the keywords extracted as the relevance.

Furthermore, when the plurality of different keywords is extracted by the extraction section for one of the pairs, the calculation section preferably calculates the degree based on a total value of the point for each of the plurality of keywords.

Furthermore, the extraction section preferably extracts timing when the relevance occurs together with the relevance, and when the plurality of keywords is extracted by the extraction section for one of the pairs, the calculation section preferably calculates the degree based on the point and change in a cumulative value of the point for each of the plurality of keywords.

Furthermore, the calculation section preferably calculates the degree to be lower as a distance between the first element and the second element increases.

Furthermore, the first element is preferably each designated element of the three or more elements, and the second element is preferably each element having a designated attribute of the three or more elements.

Furthermore, when there is a plurality of the second elements, the calculation section preferably calculates the degree for each of the second elements.

Furthermore, the affinity calculation apparatus preferably further comprises a display section configured to display each of the second elements with the greatest degree more highlighted than the other second elements.

BRIEF DESCRIPTION OF THE DRAWINGS

The above and other objects, advantages and features of the present invention will become more fully understood from the detailed description given hereinbelow and the appended drawings which are given by way of illustration only, and thus not intended as a definition of the limits of the present invention, and wherein:

FIG. 4 is a diagram illustrating an example of point dictionary data;

FIG. 5 is a diagram illustrating an example of element attribute data;

FIG. 7 is a diagram illustrating an example of correlation data;

FIG. 14 is a diagram illustrating an example of the correlation data; and

DESCRIPTION OF THE PREFERRED EMBODIMENTS

Hereinafter, an embodiment of the present invention will be described with reference to the drawings. However, the scope of the invention is not limited to the illustrated examples.

First Embodiment

Figure 1:
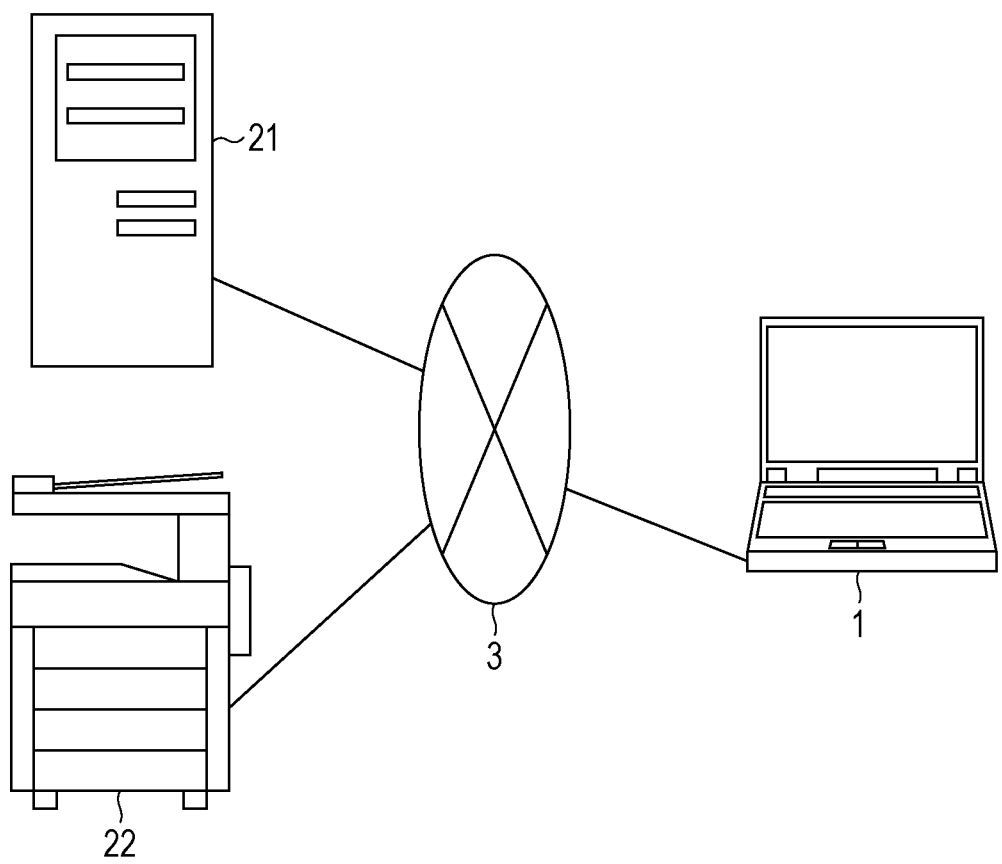
FIG. 1 is a diagram illustrating an example of an overall configuration of a system including a relevant element search apparatus.
Figure 2:
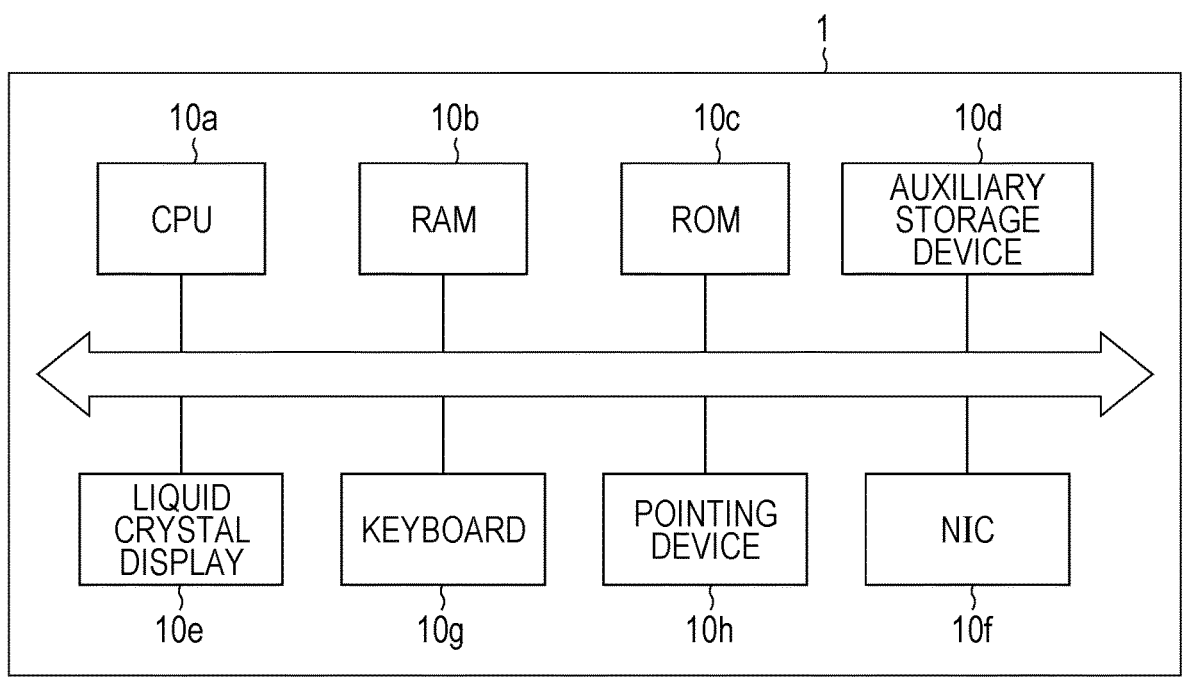
FIG. 2 is a diagram illustrating an example of a hardware configuration of the relevant element search apparatus.

FIG. 1 is a diagram illustrating an example of an overall configuration of a system including a relevant element search apparatus 1. FIG. 2 is a diagram illustrating an example of a hardware configuration of the relevant element search apparatus 1.

The relevant element search apparatus 1 is an apparatus that searches for an element (hereinafter referred to as "relevant element") that is directly or indirectly relevant to an element (hereinafter referred to as "central element"). As illustrated in FIG. 1, the relevant element search apparatus 1 is connected to apparatuses such as a web server 21 and an image forming apparatus 22 via a communication line 3. As the communication line 3, the Internet, a local area network (LAN), a public line, or a dedicated line is used.

The following describes an example in which a notebook personal computer is used as the relevant element search apparatus 1.

As illustrated in FIG. 2, the relevant element search apparatus 1 includes a central processing unit (CPU) 10a, a random access memory (RAM) 10b, a read only memory (ROM) 10c, an auxiliary storage device 10d, a liquid crystal display 10e, a network interface card (NIC) 10f, a keyboard 10g, and a pointing device 10h.

The liquid crystal display 10e displays screens such as a screen indicating a message to a user, a screen for the user to enter commands or information, and a screen indicating a result of a process performed by the CPU 10a.

The NIC 10f communicates with apparatuses such as the web server 21 and the image forming apparatus 22 via the communication line 3 according to a protocol such as TCP/IP.

The keyboard 10g and the pointing device 10h are used for the user to enter commands or information.

The ROM 10c or the auxiliary storage device 10d stores a preferred element search program 10P, in addition to an operating system and a web browser. The preferred element search program 10P is a program for searching for the relevant element to the central element.

These programs are loaded in the RAM 10b and executed by the CPU 10a. As the auxiliary storage device 10d, a device such as a hard disk drive and a solid state drive (SSD) is used.

The web server 21 provides various documents as a web page. The relevant element search apparatus 1 can download data of the web page from the web server 21.

The image forming apparatus 22 is an apparatus that integrates functions such as copy, network print, facsimile, scan, and box. In general, the image forming apparatus 22 is sometimes referred to as "multifunction machine" or "multifunction peripherals (MFP)."

The network print function is a service to print images on paper based on image data received from a personal computer, a tablet computer, a smartphone, or any other devices. The network print function is sometimes referred to as "network printing" or "PC print."

The box function is a service to provide each user with a storage area called "box" or "personal box", and to allow the user to save and manage data such as document data in the storage area for the user. The box corresponds to "folder" or "directory" of a personal computer. Furthermore, the box function allows data saved in the box to be provided to the relevant element search apparatus 1 via the communication line 3.

The following describes a mechanism of the relevant element to the central element by taking a case where a certain company is the central element and another company is the relevant element as an example.

Figure 3:
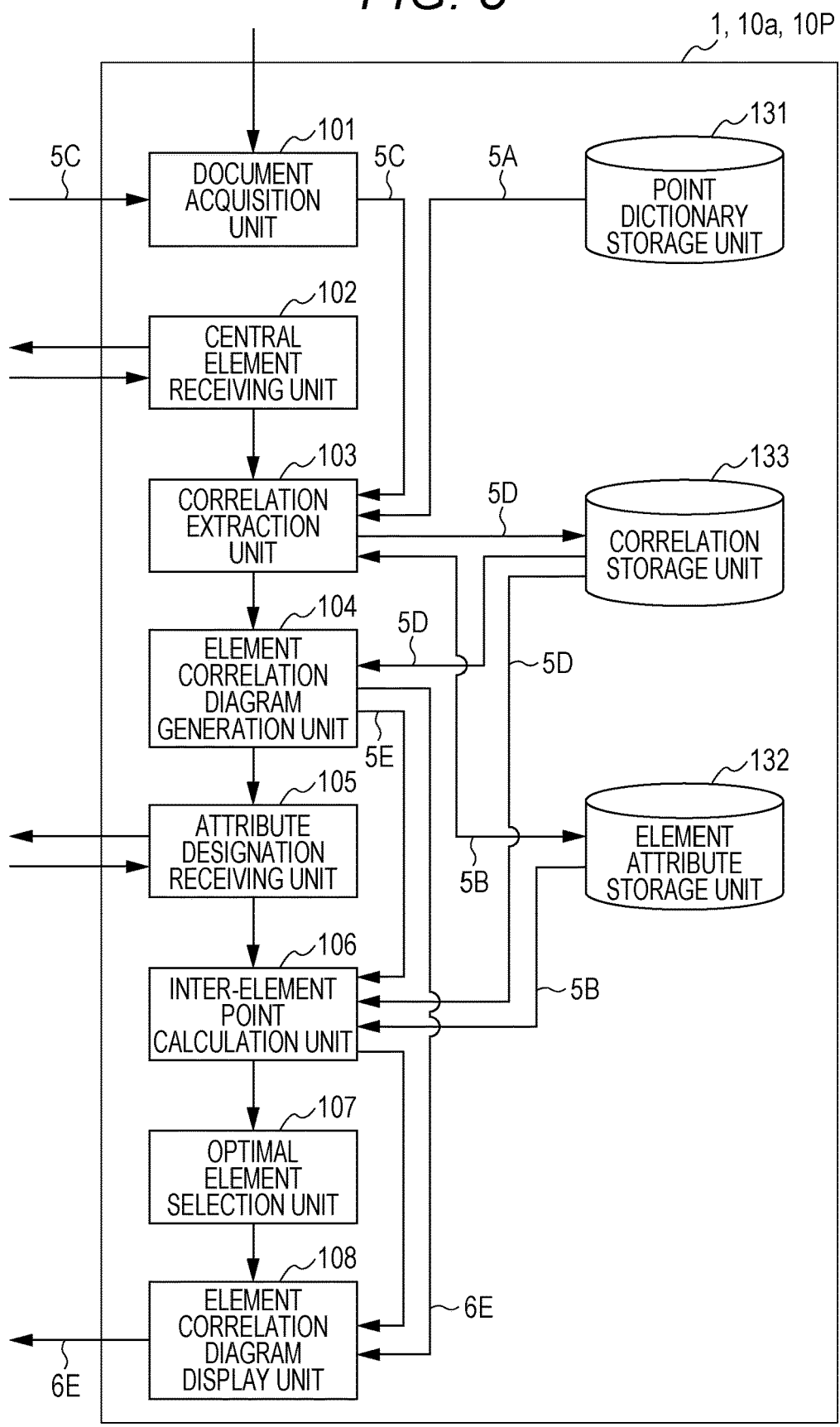
FIG. 3 is a diagram illustrating an example of a functional configuration of the relevant element search apparatus.
Figure 6:
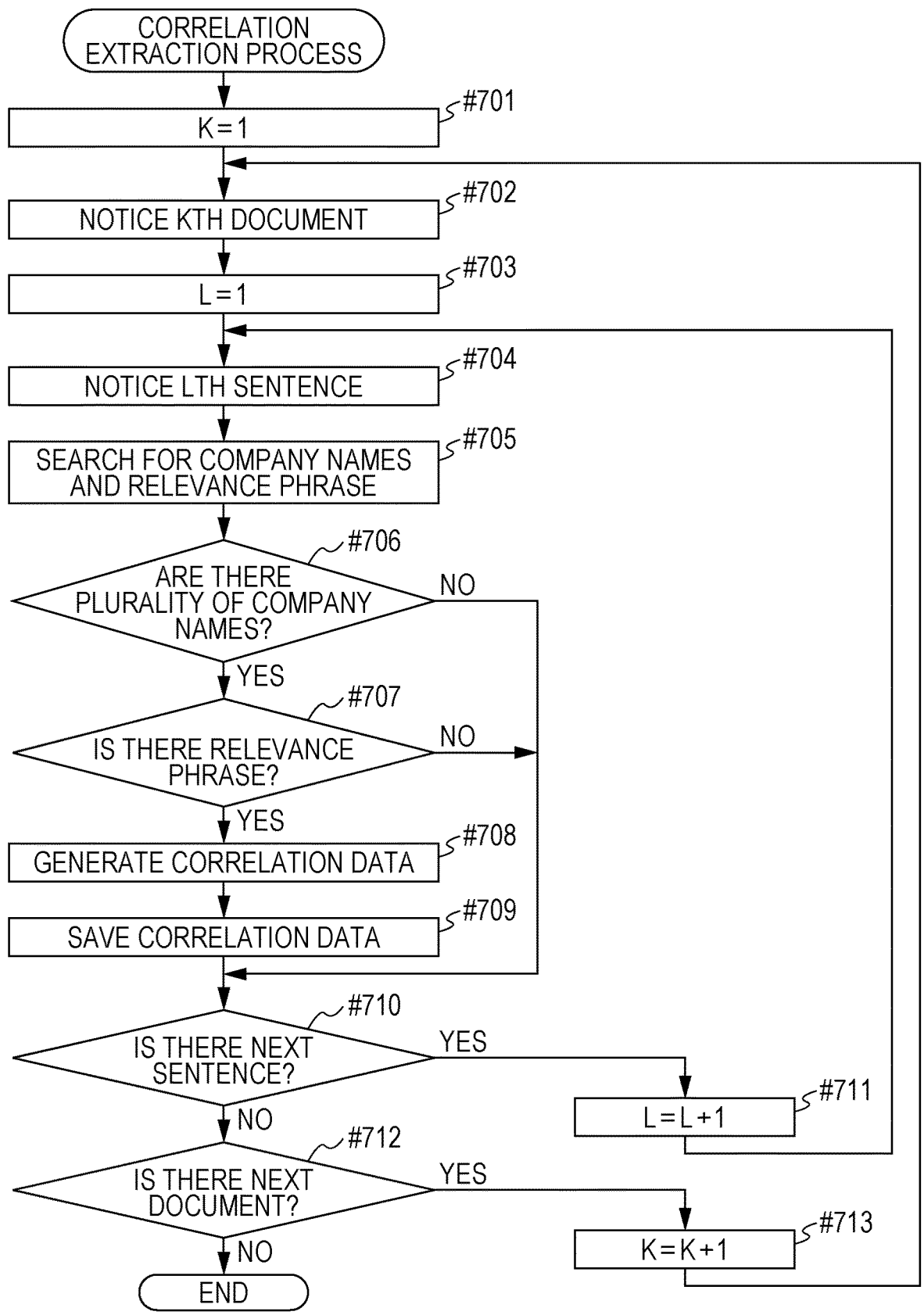
FIG. 6 is a flowchart illustrating an example of a correlation extraction process flow.
Figure 8A:
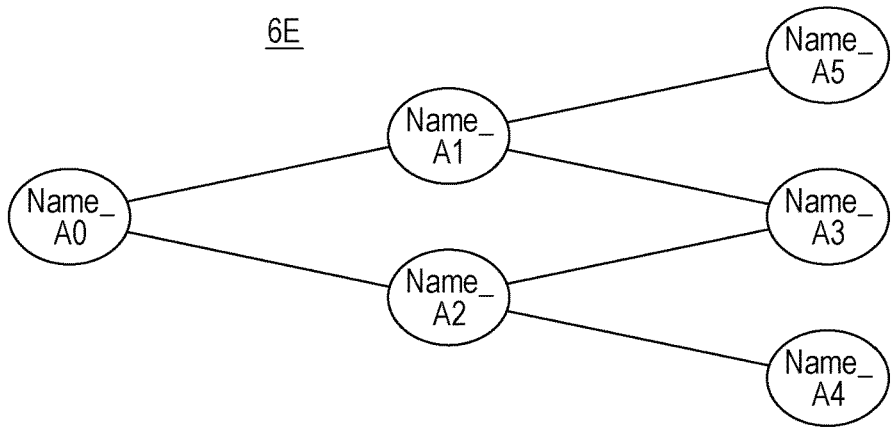
FIGS. 8A to 8C are diagrams illustrating examples of a correlation diagram.
Figure 8B:
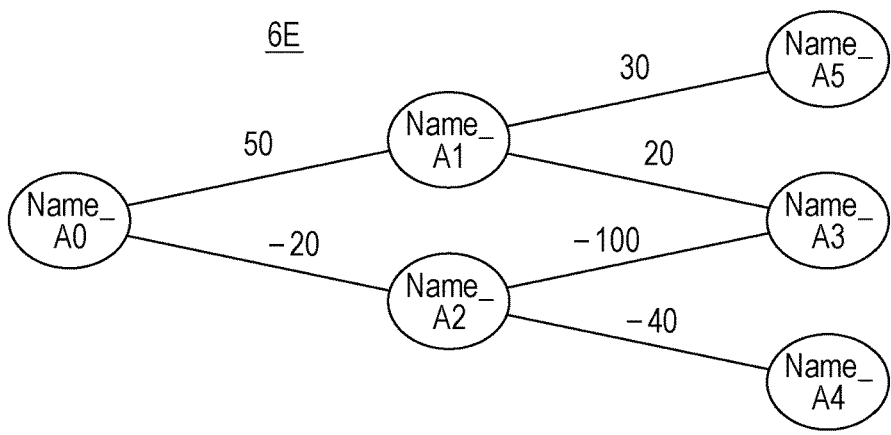
Figure 8C:
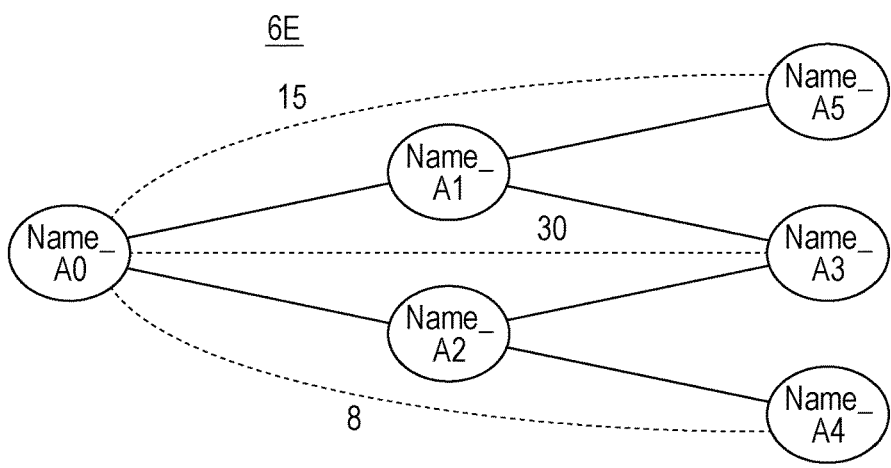
Figure 9:
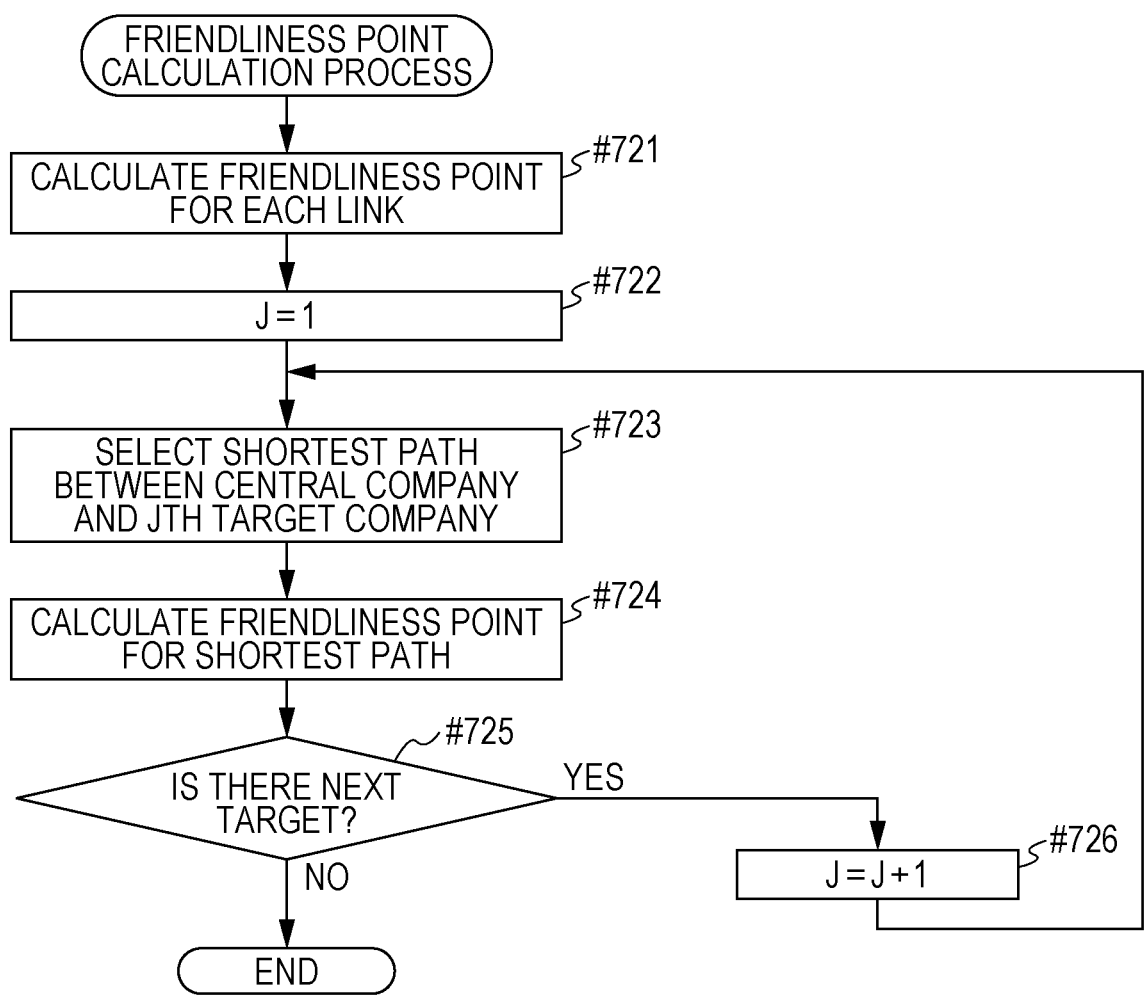
FIG. 9 is a flowchart illustrating an example of a friendliness point calculation process flow.
Figure 10:
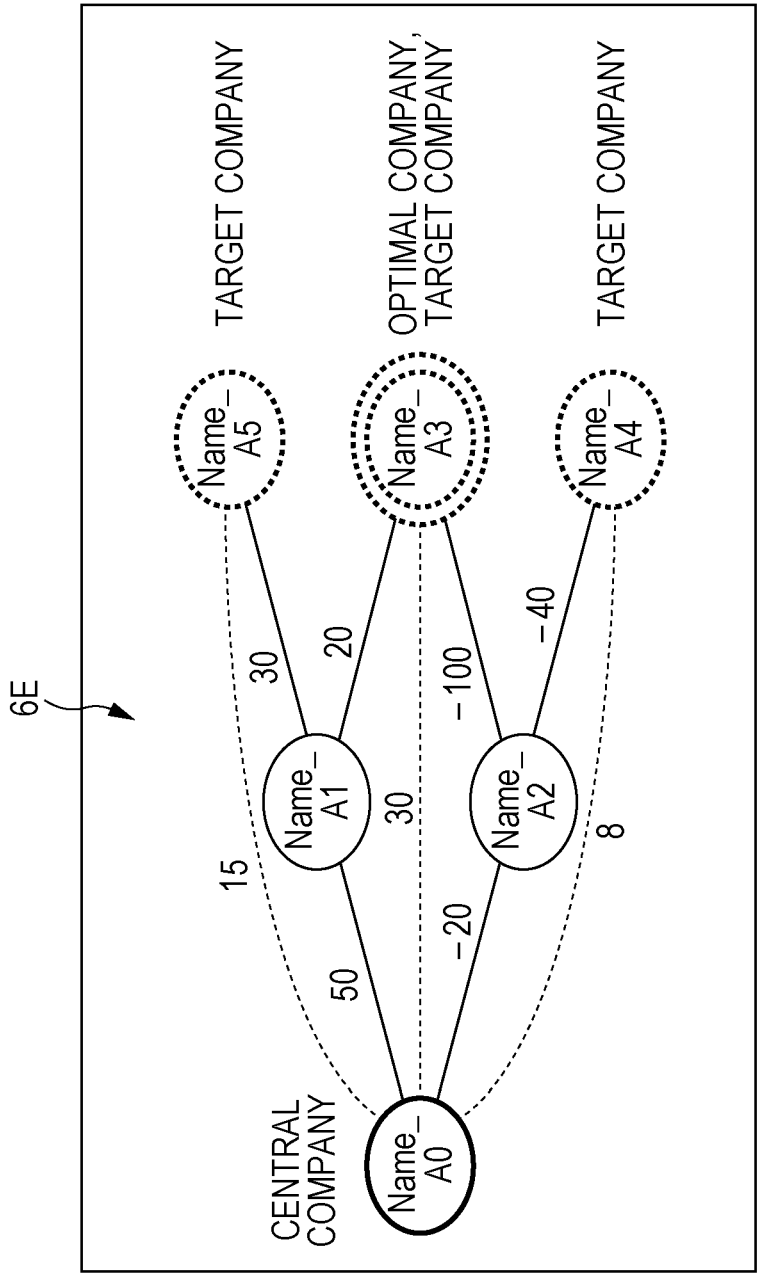
FIG. 10 is a diagram illustrating an example of display of the correlation diagram.

FIG. 3 is a diagram illustrating an example of a functional configuration of the relevant element search apparatus 1. FIG. 4 is a diagram illustrating an example of point dictionary data 5A. FIG. 5 is a diagram illustrating an example of element attribute data 5B. FIG. 6 is a flowchart illustrating an example of a correlation extraction process flow. FIG. 7 is a diagram illustrating an example of correlation data 5D. FIGS. 8A to 8C are diagrams illustrating examples of a correlation diagram 6E. FIG. 9 is a flowchart illustrating an example of a friendliness point calculation process flow. FIG. 10 is a diagram illustrating an example of display of the correlation diagram 6E.

The preferred element search program 10P allows the relevant element search apparatus 1 to achieve functions illustrated in FIG. 3, such as a document acquisition unit 101, a central element receiving unit 102, a correlation extraction unit 103, an element correlation diagram generation unit 104, an attribute designation receiving unit 105, an inter-element point calculation unit 106, an optimal element selection unit 107, an element correlation diagram display unit 108, a point dictionary storage unit 131, an element attribute storage unit 132, and a correlation storage unit 133.

The point dictionary storage unit 131 stores the point dictionary data 5A for each relevance phrase, as illustrated in FIG. 4. "The relevance phrase" is a phrase (keyword) indicating relevance between a plurality of elements.

The point dictionary data 5A indicates a relevance point for the relevance phrase. "The relevance point" is a value indicating how strong the relevance is between the plurality of elements. The relevance point is expressed by the relevance phrase. Furthermore, whether the value is positive or negative represents how good the relevance is in some cases.

In the first embodiment, a friendliness point is used as the relevance point. The friendliness point is a value indicating how strong a friendly relationship is between two elements (companies). The positive friendliness point represents that the two companies are in a good relationship, whereas the negative friendliness point represents that the two companies are in a tense relationship.

As illustrated in FIG. 5, the element attribute storage unit 132 stores element attribute data 5B for each element (company in the first embodiment).

The element attribute data 5B indicates attributes of the company, such as a business type and location of the company, in addition to a company name of the company.

The point dictionary data 5A and the element attribute data 5B are prepared in advance by a person such as an administrator. The point dictionary data 5A and the element attribute data 5B are appropriately updated as necessary.

The document acquisition unit 101 acquires document data 5C. The document data 5C is data for displaying a document including character strings, charts, illustrations, and photos. The document data 5C is data in a format such as a text format, hypertext markup language (HTML), and portable document format (PDF).

The document acquisition unit 101 may acquire a file designated by the user as the document data 5C from the web server 21 or the image forming apparatus 22. Alternatively, the document acquisition unit 101 may search the web server 21 for a web page by using a phrase designated by the user as a search key, and acquire a file of the hit web page as the document data 5C. Alternatively, the document acquisition unit 101 may search the box of the image forming apparatus 22 for a document by using a predetermined phrase as a search key, and acquire a file of the hit document as the document data 5C.

In the first embodiment, data of a document on a company is acquired as the document data 5C. In particular, data of a document on a company that is the central element (hereinafter referred to as "central company") is acquired. Moreover, data of a document on a company that is likely to have direct or indirect relevance to the central company is acquired. The user designates a file or a phrase such that such data is acquired as the document data 5C.

The central element receiving unit 102 performs a process of receiving a name of the company (company name) that is a central element, that is, a central company, as follows, for example.

The central element receiving unit 102 displays a screen for entering the company name of the central company on the liquid crystal display 10e. Here, the user enters the name of the central company with a device such as the keyboard 10g. The central element receiving unit 102 then receives the entered company name.

The correlation extraction unit 103 performs, for example, by a procedure illustrated in FIG. 6, a process of extracting correlation between the elements (companies) indicated in the document data 5C acquired by the document acquisition unit 101, and generating data indicating the correlation.

The correlation extraction unit 103 notices first document data 5C (#701 and #702 of FIG. 6), and notices a first sentence indicated in the document data 5C (#703 and #704).

The correlation extraction unit 103 searches the noticed sentence for any relevance phrase and a plurality of company names (#705). This relevance phrase is indicated in either piece of the point dictionary data 5A stored in the point dictionary storage unit 131. The company names are indicated in either piece of the element attribute data 5B stored in the element attribute storage unit 132.

When the noticed sentence indicates company names of a plurality of companies (YES in #706) and this sentence indicates a relevance phrase (YES in #707), the correlation extraction unit 103 determines that these companies have direct relevance expressed by this relevance phrase, and generates the correlation data 5D (#708).

As in FIG. 7, the correlation data 5D indicates two company names among these company names, this relevance phrase, and the friendliness point. The friendliness point is a friendliness point for this relevance phrase indicated in the point dictionary data 5A (see FIG. 4).

When company names of three or more companies are indicated, the correlation extraction unit 103 generates the correlation data 5D for each combination of two companies among these companies.

For example, when this sentence indicates three company names "Name_A1", "Name_A2", and "Name_A3", and indicates the relevance phrase "alliance", then the correlation extraction unit 103 generates data indicating "Name_A1, Name_A2, alliance, 50", data indicating "Name_A1, Name_A3, alliance, 50" and data indicating "Name_A2, Name_A3, alliance, 50" as the correlation data 5D. Here, the friendliness point "50" is based on the point dictionary data 5A for "alliance."

The correlation extraction unit 103 then causes the correlation storage unit 133 to store the correlation data 5D (#709).

However, if this sentence includes a wording that cancels this relevance phrase or a negative wording for this relevance phrase, the correlation extraction unit 103 may skip generating the correlation data 5D based on this sentence.

For example, sentences "not make an alliance", "dissolve alliance", and "difficult to make an alliance" include wording that cancels the relevance phrase or negative wording for the relevance phrase, "not make", "dissolve", and "difficult." In such a case, the correlation extraction unit 103 may skip generating the correlation data 5D.

Also when the correlation data 5D that indicates identical content (relevance phrase, friendliness point, and company names of two companies) has already been stored in the correlation storage unit 133, the correlation extraction unit 103 may skip generating the correlation data 5D.

When the document data 5C is data of a document created mainly by the central company, the correlation extraction unit 103 may handle first-person phrases of the company, such as "our company", "this company", and "we", as the company name of the central company.

When the noticed document data 5C includes a next sentence (YES in #710), the correlation extraction unit 103 notices this sentence (#711 and #704), and appropriately performs the same process as described above (#705 to #709). Then, the correlation extraction unit 103 appropriately performs the process of steps #705 to #709 until there is no unnoticed sentence.

When there is any unnoticed document data 5C (YES in #712), the correlation extraction unit 103 notices the unnoticed document data 5C (#713 and #702), and performs the process of steps #703 to #711 as appropriate.

Thus, the correlation extraction unit 103 extracts the correlation between the plurality of companies from each sentence indicated in each document data 5C, generates the correlation data 5D, and causes the correlation storage unit 133 to store the correlation data 5D.

The element correlation diagram generation unit 104 generates correlation diagram data 5E. The correlation diagram data 5E is data for reproducing the correlation diagram 6E as illustrated in FIG. 8A indicating a relationship between elements (companies in the first embodiment).

In the correlation diagram 6E, an ellipse represents an element (company), and a company name of the company is indicated within the ellipse. A line segment that connects two ellipses is a link representing that the companies of these ellipses are directly relevant. The company names of both of the companies are indicated in one of the correlation data 5D stored in the correlation storage unit 133.

The correlation diagram 6E can be calculated by a known method based on the correlation data 5D stored in the correlation storage unit 133.

Among elements relevant to the central company directly or indirectly (hereinafter referred to as "relevant companies"), the attribute designation receiving unit 105 performs, for example, as follows, a process of receiving the attribute common to the relevant companies the user wants to know. The following describes an example in which the business type is used as the attribute.

The attribute designation receiving unit 105 displays a screen for entering the business type on the liquid crystal display 10e. Here, the user enters the business type with a device such as the keyboard 10g. The central element receiving unit 102 then receives the entered business type. For example, when the user wants to know a company of a medical equipment manufacturer as the relevant company to the central company, the user enters "medical equipment manufacturer." Hereinafter, a company of the business type received by the attribute designation receiving unit 105 is described as "target company."

The inter-element point calculation unit 106 calculates the friendliness point between the company received by the central element receiving unit 102, that is, the central company, and the company of the business type received by the attribute designation receiving unit 105, that is, the target company, by a procedure illustrated in FIG. 9.

The inter-element point calculation unit 106 calculates the friendliness point for each link (#721 of FIG. 9).

For one link, only one piece of correlation data 5D may be stored in the correlation storage unit 133, or a plurality of pieces of correlation data 5D may be stored in the correlation storage unit 133.

When only one piece of correlation data 5D is stored for a certain link, the inter-element point calculation unit 106 calculates the friendliness point indicated in the correlation data 5D as the friendliness point for the link. Therefore, for example, as illustrated in FIG. 7, only one piece of correlation data 5D is stored for a link between a company having a company name "Name_A0" and the company having the company name "Name_A2." The correlation data 5D indicates "−20" as the friendliness point. Therefore, "−20" is calculated as the friendliness point for the link.

Meanwhile, when a plurality of pieces of correlation data 5D are stored for a certain link, a total value of the friendliness points indicated in these pieces of correlation data 5D is calculated as the friendliness point for the link. Therefore, for example, two pieces of correlation data 5D are stored for a link between the company having the company name "Name_A0" and the company having the company name "Name_A1." For these pieces of correlation data 5D, "30" and "20" are indicated as the friendliness points. Therefore, the total value of these friendliness points, that is, "50" is calculated as the friendliness point for this link.

As a result of the process in step #721, the friendliness point for each link as illustrated in FIG. 8B is calculated.

The inter-element point calculation unit 106 notices the first target company (#722), and selects the shortest path between the central company and the noticed target company (#723).

For example, when the company having the company name "Name_A0" is the central company and a company having a company name "Name_A4" is the noticed target company, the inter-element point calculation unit 106 selects, as the shortest path, a path including a link of the companies of the company names "Name_A0" and "Name_A1" and a link of the companies of the company names "Name_A1" and "Name_A4."

The inter-element point calculation unit 106 then calculates the friendliness point for the selected shortest path by Equation (1) (#724).

[Equation 1]

$$Y = \left( \prod_{i=1}^{n} Pi \right) \times \frac{1}{M^{(n-1)}} \quad (1)$$

Here, "Y" is a friendliness point for the shortest path selected. "Pi" is a friendliness point for the ith link among the links that constitute the shortest path. "N" is the number of links that constitute the shortest path selected.

"M" is a constant equal to or greater than 1, and is preferably the maximum value of the friendliness points defined in the point dictionary data 5A. Therefore, in the example of FIG. 4, preferably M is "100." The following describes an example in which M=100.

That is, the inter-element point calculation unit 106 calculates a value obtained by dividing, (N−1) times, a product of the friendliness points for the links constituting the shortest path by M as the friendliness point for the selected shortest path.

When the company having the company name "Name_A0" is the central company and the company having the company name "Name_A4" is the noticed target company, $Y=((-20)\times(-40))/100=8$ is calculated as the friendliness point for the selected shortest path.

When there is an unnoticed target company (YES in #725), the inter-element point calculation unit 106 notices this target company (#726), and calculates the friendliness point between the central company and the noticed target company (#723 to #724).

Meanwhile, there is a plurality of shortest paths in some cases. In these cases, the inter-element point calculation unit 106 selects all of the plurality of shortest paths in step #723. Then, in step #724, the inter-element point calculation unit 106 calculates the friendliness points for all the selected shortest paths, and calculates a total value of these friendliness points.

For example, when the company having the company name "Name_A0" is the central company and the company having the company name "Name_A3" is the noticed target company, there are two shortest paths.

Therefore, the inter-element point calculation unit 106 calculates the friendliness point for each of the two shortest paths.

The friendliness point for the first shortest path is $Y=(50\times20)/100=10$.

The friendliness point for the second shortest path is $Y=(-20\times(-100))/100=20$.

Then, the total value $10+20=30$ of these friendliness points is calculated.

When the company having the company name "Name_A0" is the central company and three companies having company names "Name_A3", "Name_A4", and "Name_A5" are target companies, the friendliness point is calculated by the process described above as illustrated in FIG. 8C.

The optimal element selection unit 107 selects the target company having the largest friendliness point with the central company from among these target companies as a company most preferred for the central company (hereinafter referred to as "optimal company"). In the example of FIG. 8C, the target company having the company name "Name_A3" is selected as an optimal company.

However, if a company directly connected to the central company is a target company, this company is excluded from candidates for optimal company selection. In addition, when a link with a negative friendliness point is included in the path between the central company and the target company, the target company may be excluded from candidates for optimal company selection.

The element correlation diagram display unit 108 displays the correlation diagram 6E on the liquid crystal display 10e. At this time, as illustrated in FIG. 10, the element correlation diagram display unit 108 highlights the optimal company more than other target companies. In addition, the element correlation diagram display unit 108 displays the friendliness point for each link and the friendliness point between the central company and each target company.

Figure 11:
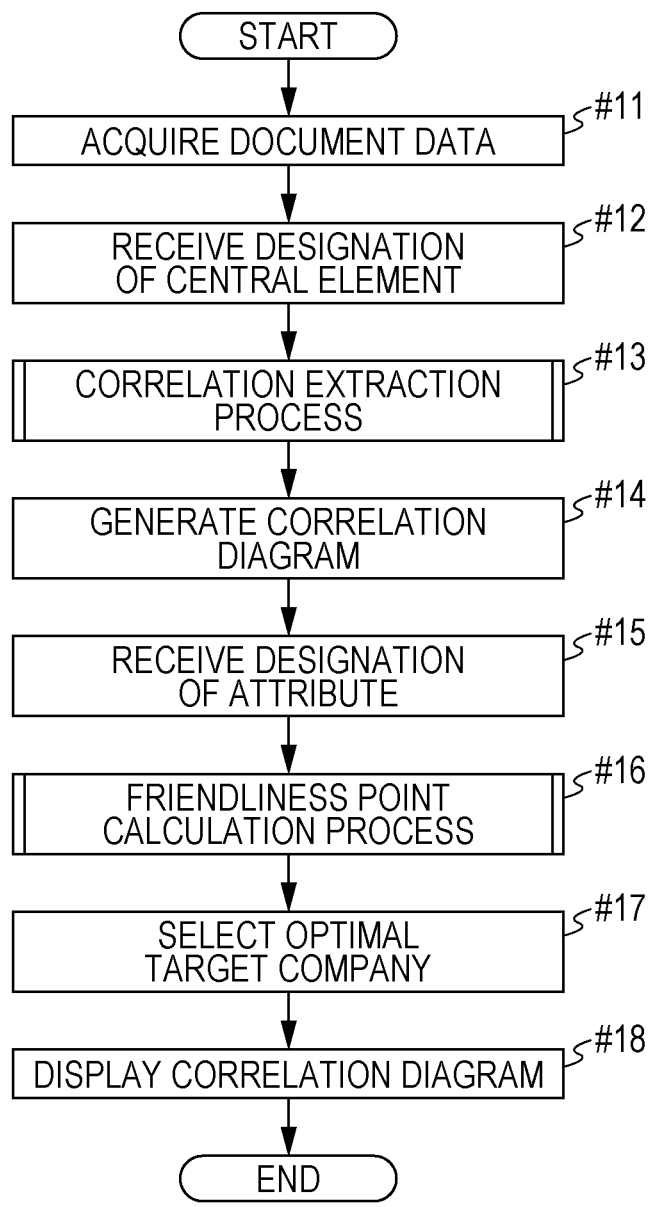
FIG. 11 is a flowchart illustrating an example of an overall process flow of the relevant element search apparatus.

FIG. 11 is a flowchart illustrating an example of an overall process flow of the relevant element search apparatus 1.

Next, the overall process flow of searching for the target company and the optimal company will be described with reference to the flowchart of FIG. 11.

The relevant element search apparatus 1 performs the process by a procedure illustrated in FIG. 11 based on the preferred element search program 10p.

The relevant element search apparatus 1 acquires the document data 5C (#11 of FIG. 11). Upon receipt of designation of the central element (for example, central company) (#12), the relevant element search apparatus 1 performs the process of generating data (correlation data 5D) indicating correlation between the elements (for example, companies) indicated in the document data 5C acquired in step #11 (#13). The procedure of this process is as described before in FIG. 6.

The relevant element search apparatus 1 generates the correlation diagram data 5E based on the correlation data 5D (#14). Furthermore, the relevant element search apparatus 1 receives the attribute common to the elements that the user wants to know (for example, relevant companies), the elements being relevant to the central element (#15).

The relevant element search apparatus 1 then calculates the friendliness point for a pair of the central element and an element having the received attribute (for example, target company) (#16). The relevant element search apparatus 1 then selects the most preferable element for the central element (for example, optimal company) (#17), and displays the correlation diagram 6E as illustrated in FIG. 10 (#18). The method for calculating the friendliness point is as described above in FIG. 9.

According to the first embodiment, the target company that is not directly relevant is presented to the user together with the friendliness point with the central company. Therefore, it is possible, more easily than before, to find the target company that is likely to be able to establish a good connection among such target companies. It is also possible to develop new customers more accurately than before.

Second Embodiment

Figure 12:
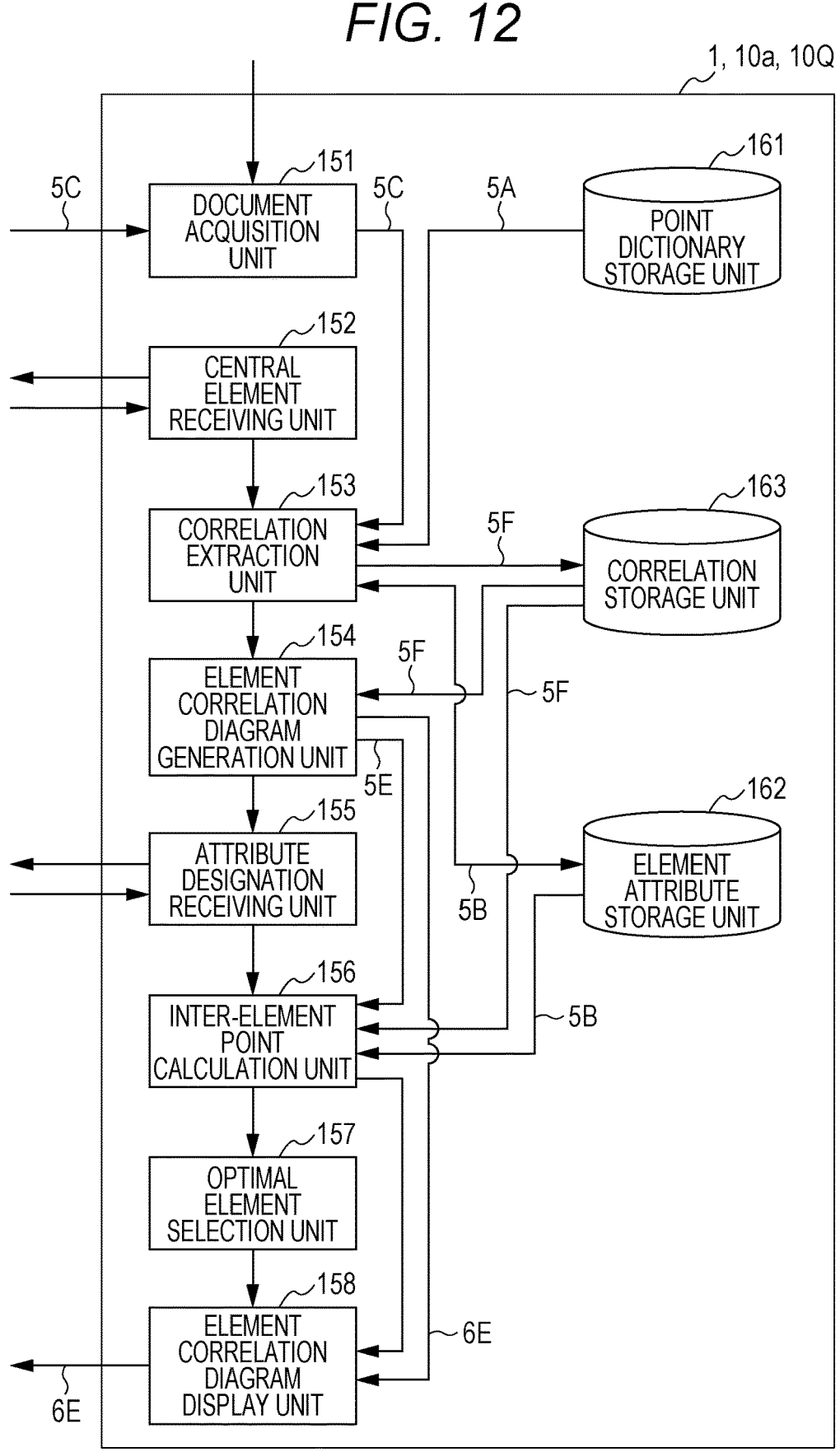
FIG. 12 is a diagram illustrating an example of the functional configuration of the relevant element search apparatus.
Figure 13:
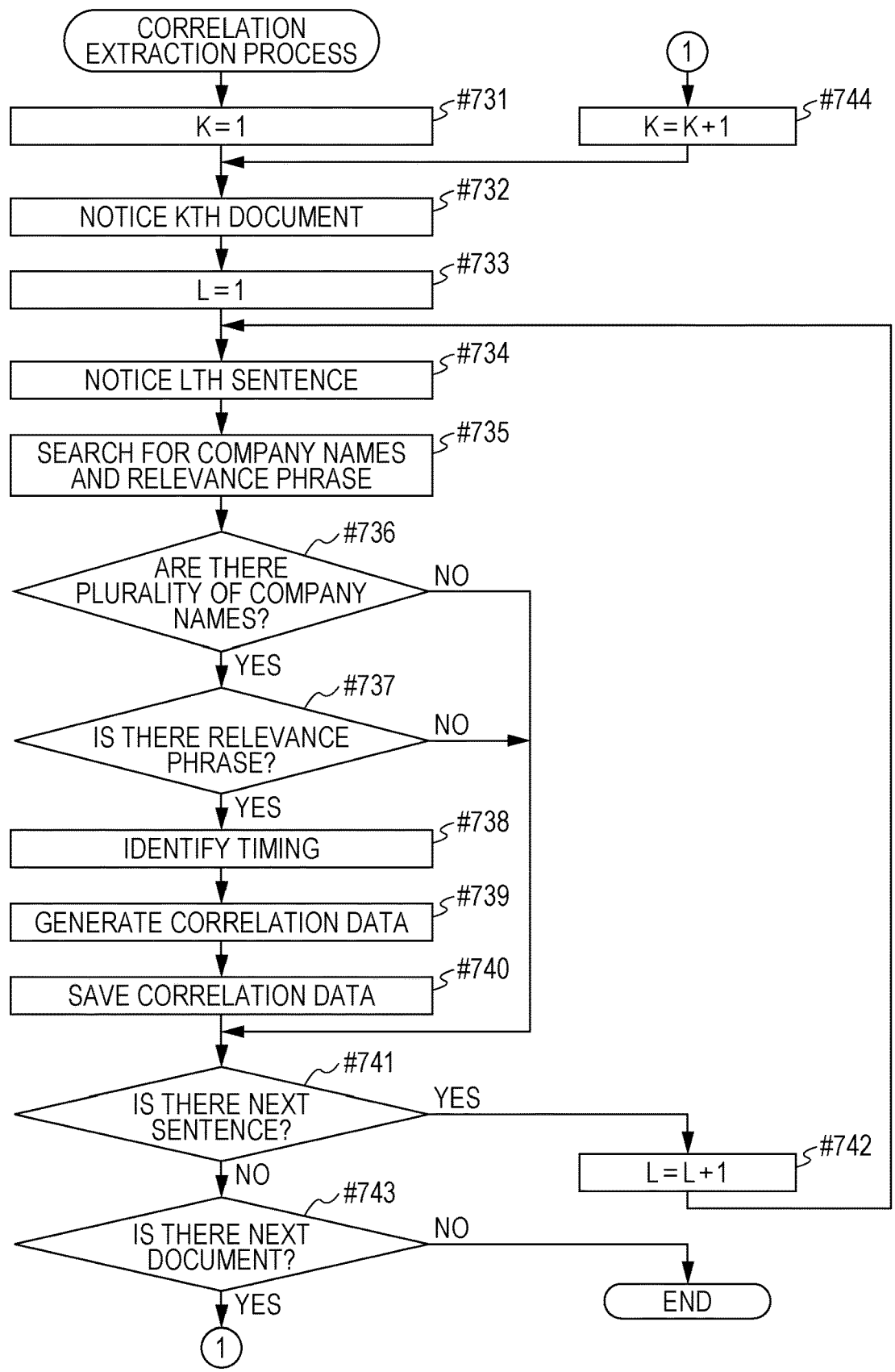
FIG. 13 is a flowchart illustrating an example of the correlation extraction process flow.
Figure 15:
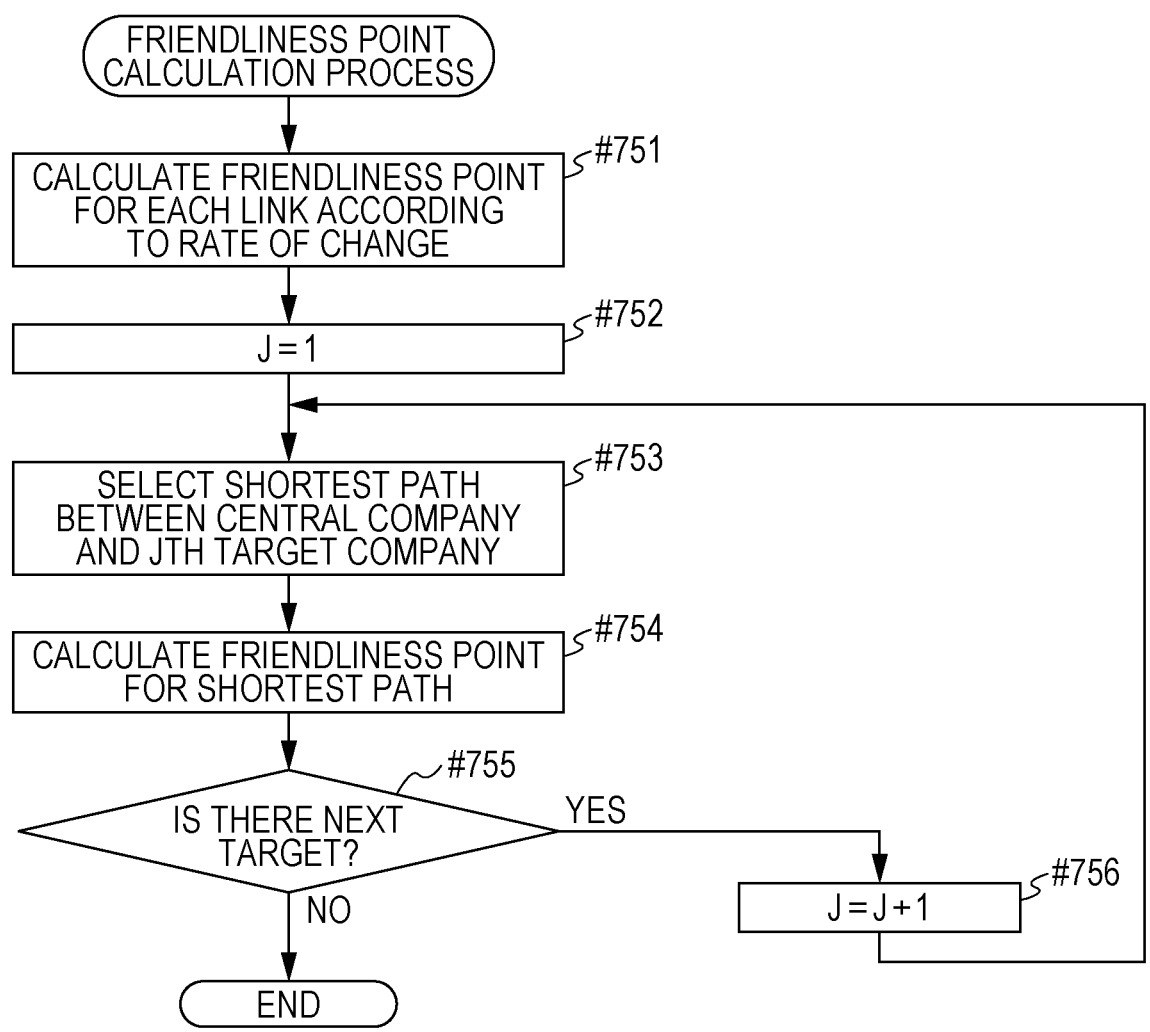
FIG. 15 is a flowchart illustrating an example of the friendliness point calculation process flow.

FIG. 12 is a diagram illustrating an example of a functional configuration of a relevant element search apparatus 1. FIG. 13 is a flowchart illustrating an example of a correlation extraction process flow. FIG. 14 is a diagram illustrating an example of correlation data 5F. FIG. 15 is a flowchart illustrating an example of a friendliness point calculation process flow.

In the first embodiment, a friendliness point between a central company and a target company is calculated regardless of timing of an event described in a document, but in a second embodiment, the friendliness point is calculated based on this timing.

The following describes a mechanism of search for an optimal company in the second embodiment when elements are companies as an example. Description of points overlapping with the first embodiment will be omitted.

A hardware configuration of the relevant element search apparatus 1 is similar to a hardware configuration of the relevant element search apparatus 1 of the first embodiment, as illustrated in FIG. 2.

A ROM 10c or an auxiliary storage device 10d stores a preferred element search program 10Q instead of a preferred element search program 10P. The preferred element search program 10Q allows achievement of functions illustrated in FIG. 12, such as a document acquisition unit 151, a central element receiving unit 152, a correlation extraction unit 153, an element correlation diagram generation unit 154, an attribute designation receiving unit 155, an inter-element point calculation unit 156, an optimal element selection unit 157, an element correlation diagram display unit 158, a point dictionary storage unit 161, an element attribute storage unit 162, and a correlation storage unit 163.

As does the point dictionary storage unit 131 of the first embodiment (see FIG. 3), the point dictionary storage unit 161 stores point dictionary data 5A (see FIG. 4).

As does the element attribute storage unit 132, the element attribute storage unit 162 stores element attribute data 5B (see FIG. 5).

As does the document acquisition unit 101, the document acquisition unit 151 performs a process of acquiring document data 5C.

However, it is preferable that a user designates a file or a phrase so as to acquire data of a document indicating not only relevance between a plurality of companies but also timing when the relevance occurs as the document data 5C.

As does the central element receiving unit 102, the central element receiving unit 152 performs a process of receiving a company name of the central company.

The correlation extraction unit 153 performs a process of generating data indicating correlation between companies indicated in the document data 5C acquired by the document acquisition unit 151, for example, by a procedure illustrated in FIG. 13.

As in steps #701 to #704 of FIG. 6, the correlation extraction unit 153 notices first document data 5C (#731 and #732 of FIG. 13), and notices a first sentence indicated in the document data 5C (#733 and #734). As in step #705, the correlation extraction unit 153 searches the noticed sentence for any relevance phrase and a plurality of company names (#735). This relevance phrase is indicated in either piece of the point dictionary data 5A stored in the point dictionary storage unit 161. The company names are indicated in either piece of the element attribute data 5B stored in the element attribute storage unit 162.

When the noticed sentence indicates company names of a plurality of companies (YES in #736) and this sentence indicates a relevance phrase (YES in #737), the correlation extraction unit 153 determines timing when an event described in this sentence occurs, that is, timing when the relevance indicated in this relevance phrase occurs (#738). Hereinafter, this timing is described as "occurrence timing." For example, a date indicated in this sentence may be determined as the occurrence timing. Alternatively, a date when this document is created may be determined as the occurrence timing. This date may be a date when data is created or a date when data is updated, indicated in a property of the document data 5C.

The correlation extraction unit 153 then generates the correlation data 5F (#739). As in FIG. 14, the correlation data 5F indicates two company names among these company names, this relevance phrase, friendliness point, and this occurrence timing. As in the correlation data 5D of the first embodiment (see FIG. 7), the friendliness point is a friendliness point for this relevance phrase indicated in the point dictionary data 5A (see FIG. 4).

As in the first embodiment, when company names of three or more companies are indicated, the correlation extraction unit 153 generates the correlation data 5F for each combination of two companies among these companies.

The correlation extraction unit 153 then causes the correlation storage unit 163 to store the correlation data 5F (#740).

As in the first embodiment, if this sentence includes a wording that cancels this relevance phrase or a negative wording for this relevance phrase, the correlation extraction unit 153 may skip generating the correlation data 5F based on this sentence.

Also when the correlation data 5F that indicates identical content (relevance phrase, friendliness point, occurrence timing, and company names of two companies) has already been stored in the correlation storage unit 163, the correlation extraction unit 153 may skip generating the correlation data 5F.

In addition, the correlation extraction unit 153 may handle first-person phrases of the company, such as "our company", "this company", and "we", as the company name of the central company.

When the noticed document data 5C includes a next sentence (YES in #741), the correlation extraction unit 153 notices this sentence (#742 and #734), and appropriately performs the same process as described above (#735 to #740). Then, the correlation extraction unit 153 appropriately performs the process of steps #735 to #740 until there is no unnoticed sentence.

When there is any unnoticed document data 5C (YES in #743), the correlation extraction unit 153 notices the unnoticed document data 5C (#744 and #732), and performs the process of steps #733 to #742 as appropriate.

Thus, the correlation extraction unit 153 extracts the correlation between the plurality of companies from each sentence indicated in each document data 5C, generates the correlation data 5F, and causes the correlation storage unit 163 to store the correlation data 5F.

Returning to FIG. 12, the element correlation diagram generation unit 154 generates correlation diagram data 5E, as does the element correlation diagram generation unit 104. However, the element correlation diagram generation unit 154 uses the correlation data 5F instead of the correlation data 5D.

As does the attribute designation receiving unit 105, the attribute designation receiving unit 155 performs the process of receiving an attribute common to the relevant companies the user wants to know.

The inter-element point calculation unit 156 calculates the friendliness point between the company received by the central element receiving unit 152, that is, the central company, and the company of the business type received by the attribute designation receiving unit 155, that is, the target company, by a procedure illustrated in FIG. 15.

The inter-element point calculation unit 156 calculates the friendliness point for each link (#751 of FIG. 15).

For one link, only one piece of correlation data 5F may be stored in the correlation storage unit 163, or a plurality of pieces of correlation data 5F may be stored.

When only one piece of correlation data 5F is stored for a certain link, the inter-element point calculation unit 156 calculates the friendliness point indicated in the correlation data 5F as the friendliness point for the link, as in step #721 of FIG. 9.

Meanwhile, when the plurality of pieces of correlation data 5F is stored for a certain link, the inter-element point calculation unit 156 calculates the friendliness point for the link by Equation (2).

[Equation 2]

$$X = \sum_{i=1}^{m} Ri \cdot Qi \qquad (2)$$

Here, "X" is a friendliness point for the link. "Qi" is a friendliness point indicated in the correlation data 5F of which the occurrence timing is ith (ith old) among these pieces of correlation data 5F. Hereinafter, the occurrence timing indicated in the ith correlation data 5F is simply described as "ith occurrence timing." "Ri" is a rate of change from a cumulative value of the friendliness point at the (i−1)th occurrence timing to a cumulative value of the friendliness point at the ith occurrence timing. That is, the following equation is satisfied.

[Equation 3]

$$Ri = \frac{\sum_{j=1}^{i} Qj}{\sum_{j=1}^{i-1} Qj} \qquad (3)$$

Here, R1 is always "1."

Therefore, according to Equation (3), for example, when the friendliness point is "50", "20", and "70" in order from old occurrence timing, the following equations are satisfied.

$R1=1$ $R2=(50+20)/50=1.4$ $R3=(50+20+70)/(50+20)=2$

Hereinafter, the inter-element point calculation unit 156 performs processing steps similar to steps #722 to #726 of the first embodiment by using the friendliness point calculated in step #751 instead of the friendliness point calculated in step #721 (#752 to #756).

Returning to FIG. 12, the optimal element selection unit 157 selects the target company having the largest friendliness point with the central company as the optimal company, as does the optimal element selection unit 107 of the first embodiment.

As does the element correlation diagram display unit 108, the element correlation diagram display unit 158 displays the correlation diagram 6E on the liquid crystal display 10*e*. However, the optimal company selected by the optimal element selection unit 157 is highlighted here, and the friendliness point calculated by the inter-element point calculation unit 156 is displayed (the friendliness point for each link, and the friendliness point between the central company and each target company).

An overall process flow in the second embodiment, that is, the process flow by the preferred element search program 10Q is basically similar to the process flow in the first embodiment, as illustrated before in FIG. 11.

However, the process illustrated in FIG. 13 is performed as the process of step #13. In addition, the process illustrated in FIG. 15 is performed as the process of step #16.

According to the second embodiment, the relevant element search apparatus 1 calculates the friendliness point between the central company and the target company also based on the timing when the relevance occurs. Therefore, the optimal company can be selected more suitably than in the first embodiment.

In the first and second embodiments, the relevant element search apparatus 1 has received designation of the central company and designation of the business type on separate screens; however, the relevant element search apparatus 1 may receive designation of the central company and designation of the business type on one screen.

In the first and second embodiments, all the functions illustrated in FIG. 3 or FIG. 12 are achieved by the relevant element search apparatus 1; however, some functions may be achieved by a server. For example, the functions of the central element receiving units 102 and 152, the attribute designation receiving units 105 and 155, and the element correlation diagram display units 108 and 158 are achieved by the relevant element search apparatus 1. These functions may be achieved through transmission of a web page for designating the central company and attributes, and a web page indicating the correlation diagram 6E from the server, and display of the web page by the web browser of the relevant element search apparatus 1. The relevant element search apparatus 1 notifies designated content to the server. The server achieves other functions. However, the server performs the processes based on the content notified from the relevant element search apparatus 1.

In the first embodiment, for a pair of two linked (adjacent) companies, when certain relevance appears in the document at least once, the correlation data 5D of the pair and the relevance has been generated. However, when the relevance appears a predetermined number of times or more, which is 2 or greater, the correlation data 5D may be generated.

The target company with a path to the central company having a distance equal to or greater than a predetermined distance may be excluded from candidates for optimal company selection. Alternatively, it is also possible not to calculate the friendliness point between such a target company and the central company.

In the first and second embodiments, the business type has been used as the attribute, but other attributes may be used, such as business performance, location, or the number of years since establishment.

The method for calculating various friendliness points in the first and second embodiments is not limited to the above-described example. For example, a plurality of friendliness points may be multiplied instead of being added.

In addition, the configuration of the whole or each part of the relevant element search apparatus 1, detailed processes, order of the processes, structure of data, and the like can be appropriately changed in accordance with the gist of the present invention.

Although the present invention has been described and illustrated in detail, it is clearly understood that the same is by way of illustrated and example only and is not to be taken by way of limitation, the scope of the present invention being interpreted by terms of the appended claims.

What is claimed is:

1. An affinity calculation apparatus for calculating a degree of affinity between a first element and a second element that are not directly relevant to each other, from among three or more elements, the affinity calculation apparatus comprising:
   a storage which stores a predetermined numerical point value in association with each of a plurality of predetermined keywords, each numerical point value being one of (i) a positive value indicating that its associated keyword represents a positive relationship between two elements, and (ii) a negative value indicating that its associated keyword represents a negative relationship between two elements, and the plurality of keywords including at least one keyword associated with a negative numerical point value and at least one keyword associated with a positive numerical point value; and
   a hardware processor configured to:
      extract, from document data, a relevance of each of pairs of two directly relevant elements among the three or more elements, the relevance being a value determined based on the numerical point values of keywords, from among the plurality of keywords, associated with the two directly relevant elements of the pair; and calculate the degree of affinity between the first element and the second element that are not directly relevant to each other, the degree of affinity being a value determined using (i) the value of the relevance of each of pairs of two directly relevant elements constituting a shortest path between the first element and the second element, inclusive, and (ii) a number of the pairs of two elements constituting the shortest path.

2. The affinity calculation apparatus according to claim 1, wherein when a plurality of different keywords are associated with one of the pairs of two directly relevant elements, the relevance of the one of the pairs of two directly relevant elements is determined based on a total value of the numerical point values of each of the plurality of different keywords.

3. The affinity calculation apparatus according to claim 1, wherein the hardware processor extracts a timing at which the relevance occurs, together with the relevance, and wherein when a plurality of keywords are associated with one of the pairs of two directly relevant elements, the relevance of the one of the pairs of two directly relevant elements is determined based on the numerical point value and a change in a cumulative value of the numerical point value of each of the plurality of keywords.

4. The affinity calculation apparatus according to claim 1, wherein the hardware processor calculates the degree to be lower as a distance between the first element and the second element increases.

5. The affinity calculation apparatus according to claim 1, wherein the first element is a designated element among the three or more elements, and wherein the second element is at least one element among the three or more elements having a designated attribute.

6. The affinity calculation apparatus according to claim 5, wherein when plural second elements exist among the three or more elements, the hardware processor calculates the degree between the first element and each of the second elements.

7. The affinity calculation apparatus according to claim 6, further comprising a display configured to display each of the second elements such that the second element with the greatest degree is more highlighted than the other second elements.

8. A method for calculating a degree of affinity between a first element and a second element that are not directly relevant to each other, from among three or more elements, the method comprising:

storing, in a storage, a predetermined numerical point value in association with each of a plurality of predetermined keywords, each numerical point value being one of (i) a positive value indicating that its associated keyword represents a positive relationship between two elements, and (ii) a negative value indicating that its associated keyword represents a negative relationship between two elements, and the plurality of keywords including at least one keyword associated with a negative numerical point value and at least one keyword associated with a positive numerical point value;

extracting, from document data, a relevance of each of pairs of two directly relevant elements among the three or more elements, the relevance being a value determined based on the numerical point values of keywords, from among the plurality of keywords, associated with the two directly relevant elements of the pair; and calculating the degree of affinity between the first element and the second element that are not directly relevant to each other, the degree of affinity being a value determined using (i) the value of the relevance of each of pairs of two directly relevant elements constituting a shortest path between the first element and the second element, inclusive, and (ii) a number of the pairs of two elements constituting the shortest path.

9. A non-transitory recording medium storing a computer readable program executable by a computer for calculating a degree of affinity between a first element and a second element that are not directly relevant to each other, from among three or more elements, the program causing the computer to, in association with a storage which stores a predetermined numerical point value in association with each of a plurality of predetermined keywords, perform processes comprising:

extracting, from document data, a relevance of each of pairs of two directly relevant elements among the three or more elements, the relevance being a value determined based on the numerical point values of keywords, from among the plurality of keywords, associated with the two directly relevant elements of the pair; and calculating the degree of affinity between the first element and the second element that are not directly relevant to each other, the degree of affinity being a value determined using (i) the value of the relevance of each of pairs of two directly relevant elements constituting a shortest path between the first element and the second element, inclusive, and (ii) a number of the pairs of two elements constituting the shortest path, wherein each numerical point value is one of (i) a positive value indicating that its associated keyword represents a positive relationship between two elements, and (ii) a negative value indicating that its associated keyword represents a negative relationship between two elements, and wherein the plurality of keywords include at least one keyword associated with a negative numerical point value and at least one keyword associated with a positive numerical point value.

10. The affinity calculation apparatus according to claim 1, wherein the document data comprises at least one of character strings, charts, illustrations, and photos.

* * * * *